(12) United States Patent
Jiang et al.

(10) Patent No.: US 12,481,683 B2
(45) Date of Patent: Nov. 25, 2025

(54) QUESTION ANSWERING METHOD, METHOD OF TRAINING A QUESTION ANSWERING MODEL, ELECTRONIC DEVICE, AND MEDIUM

(71) Applicant: Beijing Baidu Netcom Science Technology Co., Ltd., Beijing (CN)

(72) Inventors: Wenbin Jiang, Beijing (CN); Yajuan Lv, Beijing (CN); Chunguang Chai, Beijing (CN); Yong Zhu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 279 days.

(21) Appl. No.: 18/157,452

(22) Filed: Jan. 20, 2023

(65) Prior Publication Data

US 2023/0153337 A1 May 18, 2023

(30) Foreign Application Priority Data

Jan. 20, 2022 (CN) .......................... 202210069222.3

(51) Int. Cl.
*G06F 16/3329* (2025.01)
*G06F 40/30* (2020.01)

(52) U.S. Cl.
CPC .......... *G06F 16/3329* (2019.01); *G06F 40/30* (2020.01)

(58) Field of Classification Search
CPC ........... G06F 16/3329; G06F 16/90332; G06F 16/3344
See application file for complete search history.

(56) References Cited

U.S. PATENT DOCUMENTS

2021/0240776 A1* 8/2021 Jawagal ................. G06N 3/049

FOREIGN PATENT DOCUMENTS

| CN | 110390003 | | 10/2019 | | |
| CN | 110390003 A | * | 10/2019 | ......... | G06F 16/3329 |
| CN | 106919655 B | * | 5/2020 | ......... | G06F 16/3344 |
| CN | 111858859 | | 10/2020 | | |
| CN | 113312461 | | 8/2021 | | |

(Continued)

OTHER PUBLICATIONS

First Chinese Office Action, in the corresponding Chinese patent application No. 202210069222.3, dated Oct. 12, 2022, 18 pages.

(Continued)

*Primary Examiner* — Feng-Tzer Tzeng
(74) *Attorney, Agent, or Firm* — HSML P.C.

(57) ABSTRACT

A question answering method, a method of training a question answering model, a device, and a medium are provided, which relate to a field of artificial intelligence technology, in particular to fields of natural language processing technology, deep learning technology, and knowledge mapping technology. The question answering method includes: obtaining data to be processed, wherein the data to be processed includes a question and candidate answers; performing general semantic understanding on the data to be processed to obtain a general data feature; selecting a target question answering mode from candidate question answering modes based on the general data feature; and processing the general data feature by using the target question answering mode, to obtain a target answer for the question from the candidate answers.

8 Claims, 8 Drawing Sheets

(56) References Cited

FOREIGN PATENT DOCUMENTS

| | | | | |
|---|---|---|---|---|
| CN | 113901302 | | 1/2022 | |
| CN | 111858859 B | * | 7/2024 | ......... G06F 16/3329 |

OTHER PUBLICATIONS

Second Chinese Office Action, in the corresponding Chinese patent application No. 202210069222.3, dated Jan. 5, 2023, 14 pages.

Shazeer et al., "Outrageously Large Neural Networks: The Sparsely-Gate Mixture-of-Experts Layer", Computer Science, Machine Learning, Jan. 2017, 19 pages, available at https://arxiv.org/pdf/1701.06538.

Zheng et al., "Question Answering Over Knowledge Graphs: Question Understanding Via Template Decomposition", Proceedings of the VLDB Endowment, vol. 11, No. 11, Aug. 2018, 14 pages.

First Korean Office Action, issued in the corresponding Korean patent appication No. 10-2022-0187955, dated Oct. 15, 2025, 14 pages with the translation.

* cited by examiner

QUESTION ANSWERING METHOD, METHOD OF TRAINING A QUESTION ANSWERING MODEL, ELECTRONIC DEVICE, AND MEDIUM

CROSS-REFERENCE TO RELATED APPLICATIONS

This application is claims priority to Chinese Application No. 202210069222.3 filed on Jan. 20, 2022, which is incorporated herein by reference in its entirety.

TECHNICAL FIELD

The present disclosure relates to a field of artificial intelligence technology, in particular to fields of natural language processing technology, deep learning technology, and knowledge mapping technology. More specifically, the present disclosure relates a question answering method, a method of training a question answering model, an electronic device, and a storage medium.

BACKGROUND

In related technologies, when a user asks a question, it is usually required to determine a target answer from a plurality of candidate answers for the question. For example, in a field of medical question answering, it is desired to determine, for a medical question asked by the user, a target answer from a plurality of candidate answers for the medical question. However, an accuracy of selecting the target answer from the plurality of candidate answers in related technologies is low, and it is difficult to meet requirements of the user.

SUMMARY

The present disclosure provides a question answering method, a method of training a question answering model, an electronic device, and a storage medium.

According to one aspect of the present disclosure, there is provided a question answering method, including: obtaining data to be processed, wherein the data to be processed includes a question and candidate answers; performing general semantic understanding on the data to be processed to obtain a general data feature; selecting a target question answering mode from candidate question answering modes based on the general data feature; and processing the general data feature by using the target question answering mode, to obtain a target answer for the question from the candidate answers.

According to another aspect of the disclosure, there is provided a method of training a question answering model, including: obtaining a sample, wherein the sample includes a question, candidate answers and a sample label, and the sample label represents an association between the candidate answers and the question; performing general semantic understanding on the sample by using a general understanding network in the question answering model to be trained, to obtain a general data feature; selecting, for candidate question answering networks in the question answering model to be trained, a target question answering network from the candidate question answering network based on the general data feature; processing the general data feature by using the target question answering network, to obtain the target answer for the question from the candidate answers; and adjusting a model parameter of the question answering model to be trained based on the target answer and the sample label.

According to another aspect of the present disclosure, there is provided an electronic device including at least one processor and a memory communicatively coupled with the at least one processor; wherein the memory stores instructions executable by the at least one processor, and the instructions, when executed by the at least one processor, cause the at least one processor to implement the question answering method and/or the method of training a question answering model described above.

According to another aspect of the present disclosure, there is provided a non-transitory computer readable storage medium storing, computer instructions, Wherein the computer instructions are configured to cause a computer to implement the question answering method and/or the method of training a question answering model described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The terms used herein are only intended to describe specific embodiments and are not intended to limit the disclosure. The terms "including", "includes", etc. used herein indicate the existence of the described features, steps, operations and/or components, but do not exclude the existence or addition of one or more other features, steps, operations or components.

All terms used herein (including technical and scientific terms) have the meanings generally understood by those skilled in the art, unless otherwise defined. It should be noted that the terms used here should be interpreted as having the meaning consistent with the context of this specification, and should not be interpreted in an idealized or too rigid way.

In a case of using an expression similar to "at least one of A, B and C", it should generally be interpreted in accordance with the meaning of the expression generally understood by those skilled in the art (for example, "systems with at least one of A, B and C" should include, but not be limited to, systems with A, B, C, A and B, A and C, B and C, and/or A, B, C, etc.).

Figure 1:
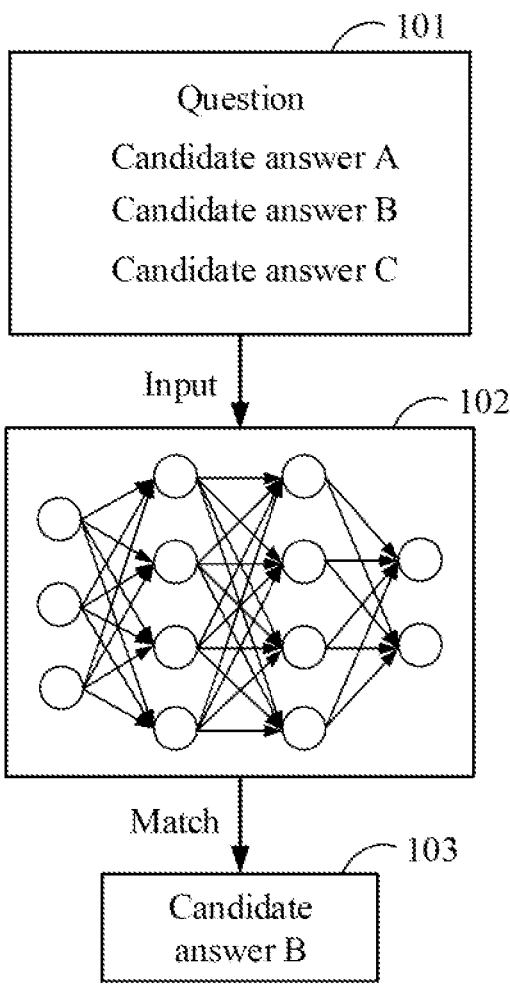
FIG. 1 schematically shows an application scenario of an example for question answering.

FIG. 1 schematically shows an application scenario of an example for question answering.

As shown in FIG. 1, an application scenario 100 of the embodiment of the present disclosure includes, for example, data 101 to be processed and a question answering model 102.

Exemplarily, the data 101 to be processed includes, for example, a question and a plurality of candidate answers A, B and C.

The data 101 to be processed is input into the question answering model 102 for processing, so as to select a target answer 103 for the question from the plurality of candidate answers A, B and C, for example, the target answer 103 includes the candidate answer B.

The question, for example, includes a medical question. The question answering model 102 includes, for example, a natural language processing model, a classification model, and so on.

Exemplarily, the question answering model 102 may be trained by using a regularization method, an ensembling method, a rehearsal method, a dual-memory method, or a sparse-coding method.

The regularization method adds restrictions when updating a model parameter of the question answering model 102, so that when the model learns a new task, a previous learning result would not be affected.

The ensembling method adds a new model when the model learns a new task, so that a plurality of tasks actually correspond to a plurality of models.

The rehearsal method mixes data of an original task when the model learns a new task, so that an old task may be taken into account when the model learns the new task.

The dual-memory method sets a long-term memory mechanism and a short-term memory mechanism with reference of the human memory mechanism. Through a cooperation between the long-term memory mechanism and the short-term memory mechanism, a coordination between new knowledge and old knowledge is achieved.

The sparse-coding method makes a model parameter become sparse so that each knowledge learning only affects a few neurons, thus reducing an interference of new knowledge to old knowledge.

The ensembling method and the sparse-coding method have been considered by the question answering method and the question answering model of the embodiments of the present disclosure. The ensembling method introduces a plurality of model networks to explicitly increases a parameter space of the model, and performs reasonable allocation in different parameter spaces, so as to achieve continuous learning. The sparse-coding method sparsely activates different parameter spaces to implicitly increases a potential of an existing parameter space, so that an impact of new knowledge on old knowledge is reduced, thereby achieving continuous learning.

The embodiment of the present disclosure provides an optimized question answering method and a method of training a question answering model. A question answering method and a method of training a question answering model according to an exemplary embodiment of the present disclosure are described below with reference to FIG. 2 to FIG. 5.

Figure 2:
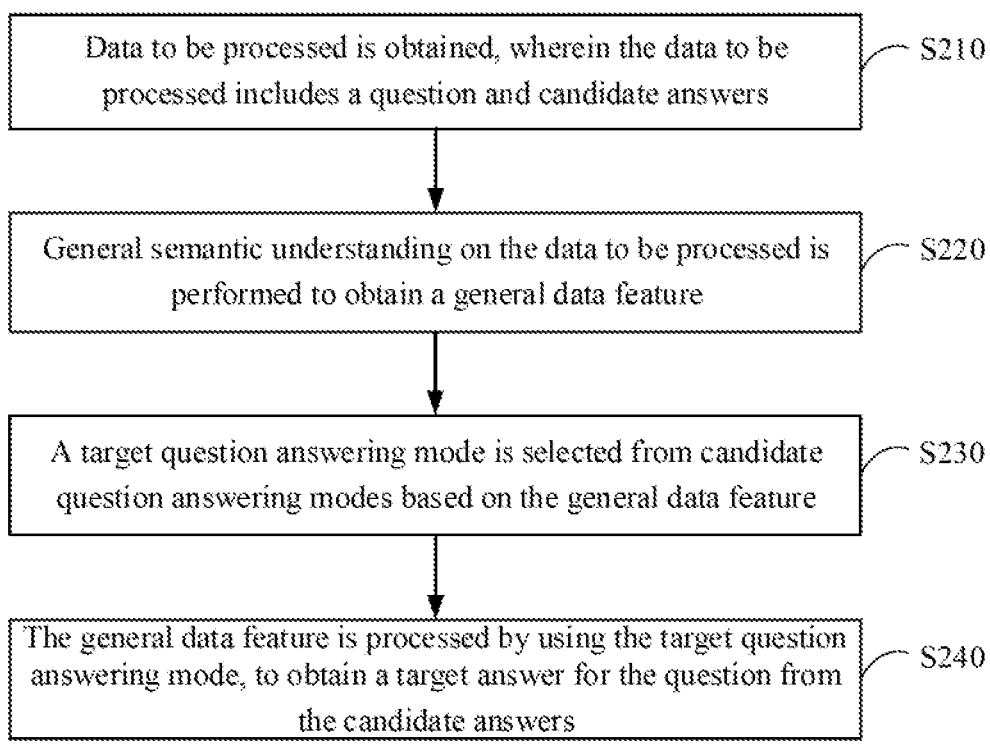
FIG. 2 schematically shows a flowchart of a question answering method according to an embodiment of the present disclosure.

FIG. 2 schematically shows a flowchart of a question answering method according to an embodiment of the present disclosure.

As shown in FIG. 2, the question answering method 200 of the embodiment of the present disclosure may include, for example, operations S210 to S240.

In operation S210, data to be processed is obtained, wherein the data to be processed includes a question and candidate answers.

In operation S220, general semantic understanding on the data to be processed is performed to obtain a general data feature.

In operation S230, a target question answering mode is selected from candidate question answering modes based on the general data feature.

In operation S240, the general data feature is processed by using the target question answering mode, to obtain a target answer for the question from the candidate answers.

Exemplarily, the data to be processed includes, for example, a question and a plurality of candidate answers. Each of the plurality of candidate answers has a different matching degree with the question. Therefore, it is desired to select the candidate answer which is has the highest matching degree with the question from the plurality of candidate answers as the target answer to the question.

For example, general semantic understanding is performed on the data to be processed to obtain the general data feature. Then the target question answering mode is selected from candidate question answering modes based on the general data feature, and the general feature data is processed by using the target question answering, mode, to obtain the target answer for the question from the plurality of candidate answers.

In an example, the data to be processed may be processed through a trained question answering model to obtain the target answer. The trained question answering model includes, for example, a deep learning model. For example, the trained question answering model includes a plurality of networks. The plurality of networks include a general understanding network and a plurality of candidate question answering networks. The candidate question answering network includes a classification network. The candidate question answering network is the candidate question answering modes.

General semantic understanding is performed on the data to be processed by using the general understanding network, to obtain the general data feature. The general data feature includes at least a feature for the question and features for the candidate answers. After selecting the target question answering network from the candidate question answering networks, the feature for the question and the features for the candidate answers are processed by using the target question answering network to realize a classification of the plurality to candidate answers, and the target answer that best matches the question is selected from the plurality of candidate answers based on a classification result.

According to the embodiment of the disclosure, general semantic understanding is performed to obtain the general data feature of the data to be processed. Then, based on the general data feature, an appropriate target question answering mode is selected from a plurality of candidate question answering modes, and the general data feature is processed by using the target question answering mode to obtain the target answer, thereby improving an accuracy of the target answer and improving a question answering effect.

Figure 3:
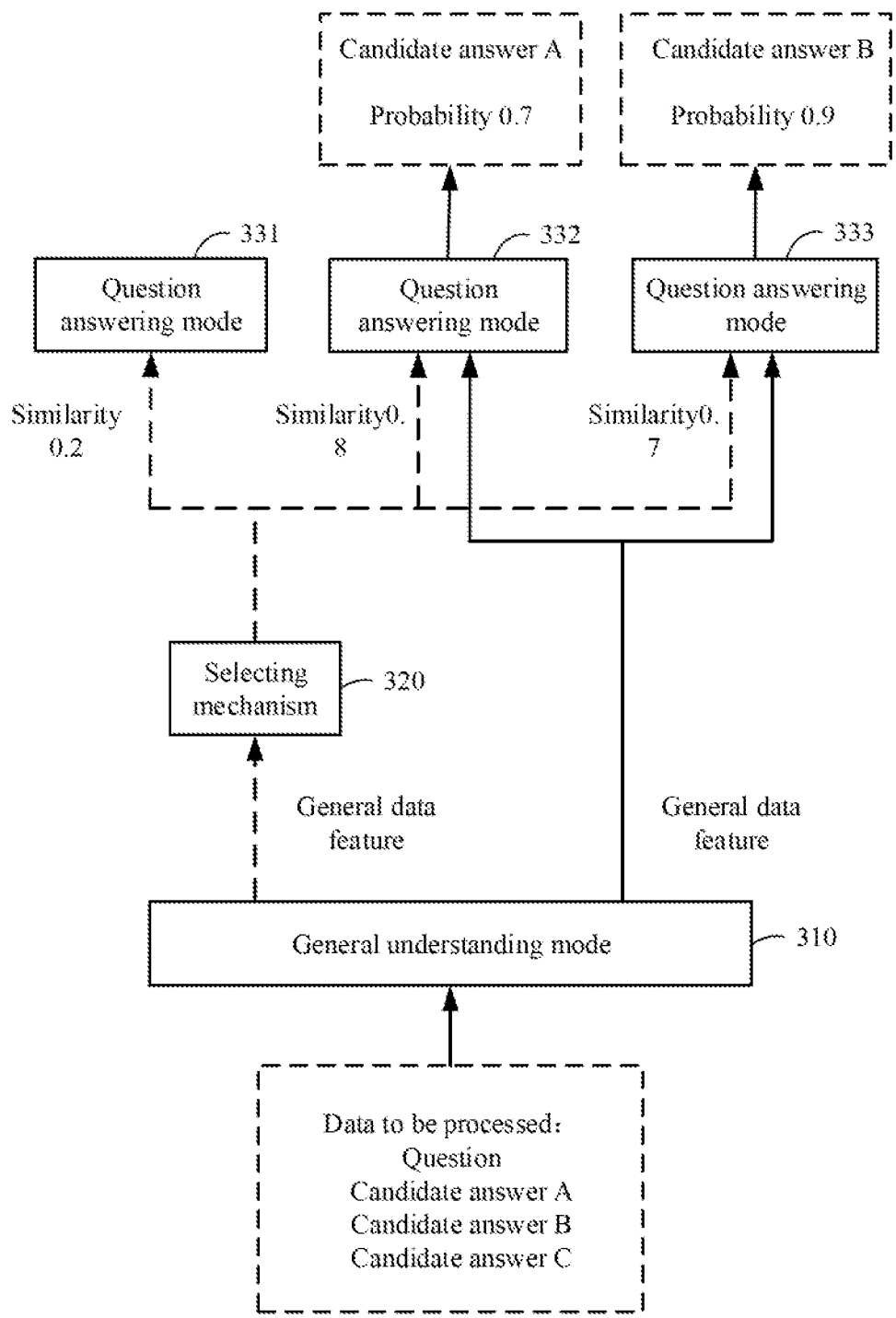
FIG. 3 schematically shows a schematic diagram of a question answering method according to an embodiment of the present disclosure.

FIG. 3 schematically shows a schematic diagram of a question answering method according to an embodiment of the present disclosure.

As shown in FIG. 3, data to be processed, for example, includes a question and a plurality of candidate answers A, B and C. General semantic understanding is performed on the data to be processed by using a general understanding mode 310 to obtain the general data feature.

Exemplarily, for a plurality of candidate question answering modes 331, 332 and 333, each candidate question answering mode includes, for example, a mode label.

A selecting mechanism 320 selects the target question answering mode from the plurality of candidate question answering modes 331, 332, and 333 based on a similarity between the general data feature and the mode label.

For example, the general data feature represents a domain information of the question, and the mode label represents a domain targeted by the candidate question answering mode. When the question is specific to a certain field, the selected target question answering mode is good at processing the question in this field.

When the question is specific to a question in a medical field, different candidate question answering modes are, for example, good at processing questions in different medical fields. Therefore, the target question answering mode that is good at handling the field to which the question belongs may be determined based on the mode label.

For example, taking a candidate question answering mode including a candidate question answering network as an example, the candidate question answering network is trained by using a sample (the sample includes a question and answers) in a medical field, so that the candidate question answering network is good at processing a medical question answering in the medical field.

For example, the similarities between the general data feature and the mode labels of the plurality of candidate question answering mode 331, 332, and 333, respectively are 0.2, 0.8, and 0.7. One or more candidate question answering modes with high similarity are selected as the target question answering modes.

In determining the number of target question answering modes, the number of target question answering modes to be selected may be determined based on a computing resource. Then, based on the determined number and the general data feature, target question answering mode(s) is selected from the plurality of candidate question answering modes, wherein the number of the selected target question answering mode(s) is the determined number.

For example, when the computing resource is sufficient, multiple target question answering modes may be selected. When the computing resource is insufficient, a small number of target question answering modes (such as one target question answering mode) may be selected. For example, when the number is 2, two candidate question answering modes with the top two similarities are selected as the target question answering modes. That is, the target question answering modes include the candidate question answering mode 332 and the candidate question answering mode 333.

After determining multiple target question answering modes, the general data feature is processed by using the multiple target question answering modes respectively, to obtain multiple target answers corresponding to the multiple target question answering modes in one-to-one correspondence.

For example, a target answer corresponding to a first target question answering mode (candidate question answering mode 332) is candidate answer A. The first target question answering mode (candidate question answering mode 332) may also output a probability 0.7 of the target answer. A target answer corresponding to a second target question answering mode (candidate question answering mode 333) is candidate answer B. The second target question answering mode (candidate question answering mode 332) may also output a probability 0.9 of the target answer.

For each target question answering mode, a weight of the target answer is determined for each target question answering mode based on the similarity. For example, a weight for the target question answering mode (candidate question answering mode 332) is 0.8, and a weight for the target question answering mode (candidate question answering mode 333) is 0.7.

Based on the weight, the target answer for the question is selected from the plurality of target answers. For example, a calculation result is obtained by multiplying the weight by the probability, and the target answer corresponding to the calculation result with high value is taken as a final target answer. For example, in a case that the calculation result of candidate answer A is 0.56 and the calculation result of candidate answer B is 0.63, candidate answer B is taken as the target answer for the question.

In another example, it is also possible that the target question answering mode outputs only the target answer, and the target answer corresponding to the target question answering mode with high similarity is taken as the final target answer.

According to the embodiment of the present disclosure, the target question answering mode is determined based on the similarity between the general data feature and the mode label of the candidate question answering mode, so that the determined target question answering mode has a higher accuracy in obtaining the target answer based on the question.

In addition, the number of target question answering mode is determined based on the computing resource, thereby improving a flexibility of data processing, in addition, in a case that the computing resource is sufficient, more target question answering modes may be used to obtain the target answer, thereby improving the accuracy of the target answer.

In addition, the weight of the target answer is determined based on the similarity, the final target answer is selected based on the weight, and a professionalism and a processing accuracy of target candidate modes are comprehensively considered, so that the accuracy of the target answer is higher.

Figure 4:
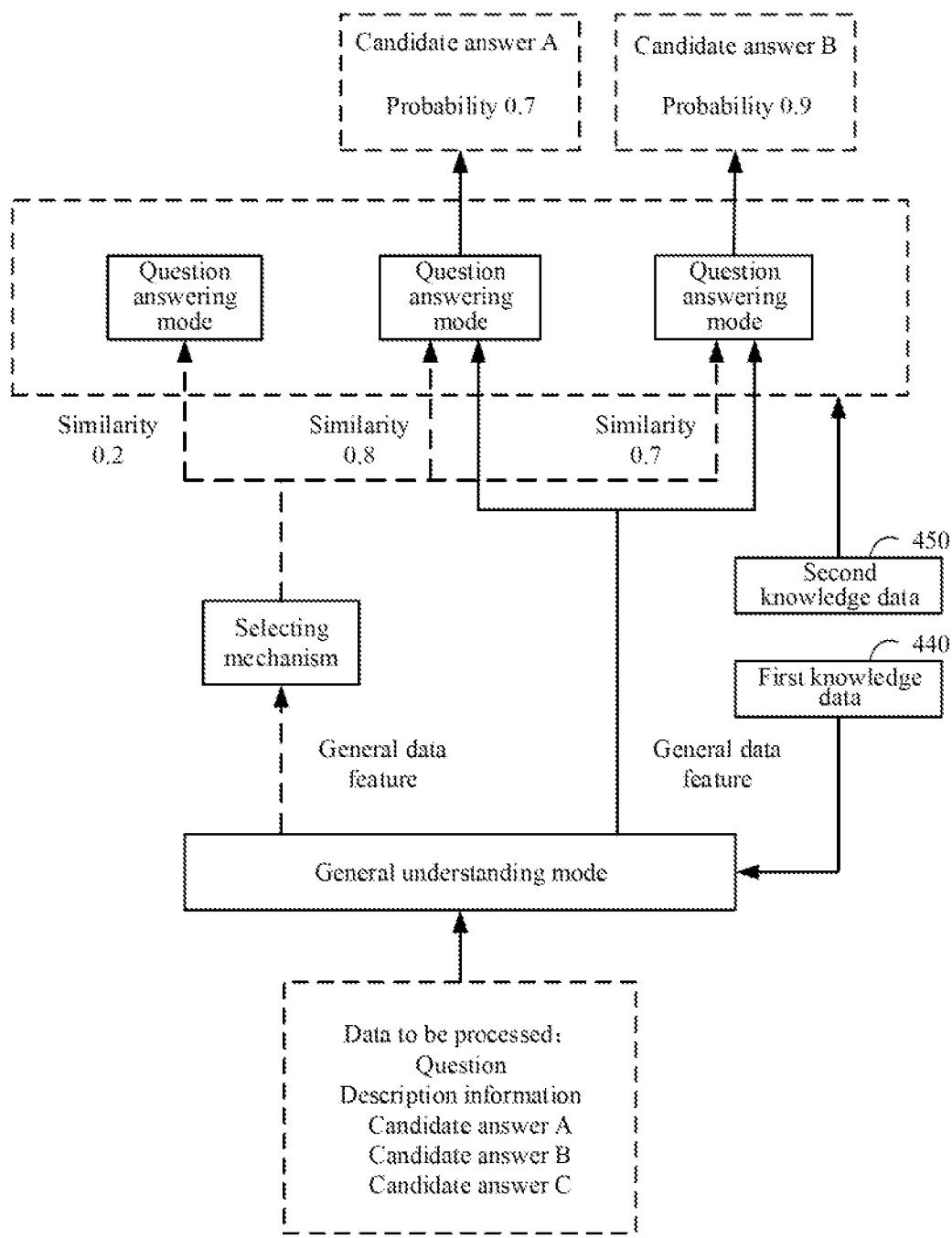
FIG. 4 schematically shows a schematic diagram of a question answering method according to another embodiment of the present disclosure.

FIG. 4 schematically shows a schematic diagram of a question answering method according to another embodiment of the present disclosure.

As shown in FIG. 4, on a basis of the above embodiments, the embodiments of the present disclosure further introduce first knowledge data 440 and second knowledge data 450.

For example, in a process of obtaining a general data features through performing general semantic understanding on data to be processed by using a general understanding network in the question answering model to be trained, the first knowledge data 440 may be obtained, and general semantic understanding is performed on the data to be processed based on the first knowledge data 440, to obtain a question feature, a candidate answer feature, and a first association information. The first association information indicates, for example, an association between the question and the candidate answers. The question feature, the candidate answer feature and the first association feature are determined as the general data feature.

The first knowledge data 440 includes, for example, common sense data or professional data. The first knowledge data 440 includes the association between the question and the candidate answers in some extent. The professional data is, for example, medical data.

In another example, the data to be processed may further include a description information for the question. In this case, the general data feature further includes a description feature for the description information. For example, when the question is a question about disease, the description information may include symptoms of the disease.

It should be understood that, since the data to be processed includes the description information, the data to be processed may include more abundant information, improving the effect of question answering.

After determining the target question answering mode, the second knowledge data 450 may be obtained, and the general data feature is processed by using the target question answering mode based on the second knowledge data 450 to obtain a second association information between the question and the candidate answers. That is, the second association information indicates, for example, an association between the question and the candidate answers. Then, based on the second, association information, the target answer for the question is determined, from the candidate answers.

The second knowledge data 450 includes, for example, common sense data or professional data. The second knowledge data 450 includes the association between the question and the candidate answers in some extent. The second knowledge data 450 may be the same as the first knowledge data 440, or the second knowledge data 450 may be different from the first knowledge data 440. The second knowledge data 450 and the first knowledge data 440 may include knowledge map data.

According to the embodiment of the present disclosure, when data processing is performed by using the general understanding mode or the target question answering mode, an accuracy of the processing result is improved by referring to the knowledge data.

In order to facilitate understanding, a specific example is given in combination with the above schematic diagram. It should be understood that this example should not cause any limitation to the present disclosure.

For example, the question is e.g. "how to solve a health problem". The description information indicates various symptoms corresponding to the health problem. The candidate answers include, for example, a plurality of solutions. For example, the health problem includes suffering from a disease, and the solution includes drugs or palliative methods for the disease. Exemplarily, the question includes 10 words, the description information includes 100 words, and the candidate answers include 10 words, for a total of 120 words.

For example, the general understanding mode has a function of natural language processing. The general understanding mode is used to process 120 words to obtain the general data feature, and the general data feature includes, for example, 120 vectors. In one way, 120 vectors may be generated by referring to the first knowledge data, so that the generated 120 vectors are associated based on a knowledge content. For example, when the question includes the word "cold" and the candidate answer includes the word "drink water", if the first knowledge data contains the knowledge that "drinking water may alleviate cold symptoms", the "cold" vector and the "drink water" vector generated based on this knowledge have a correlation (the correlation including, for example, similar vectors).

Next, the 120 vectors obtained from the general understanding mode may be processed (such as averaged) to obtain a target vector. For each candidate question answering mode, each candidate question answering mode has, for example, a mode label, which is configured to represent a domain targeted by the candidate question answering mode. The mode label may be a vector. The selecting mechanism may match the target vector with each model label to activate one or more candidate question answering modes with the top similarities as the target question answering modes.

Then, the 120 vectors are respectively input into each activated target question answering mode, and each activated target question answering mode outputs target answer(s). If multiple target question answering modes are activated, the output target answers are weighted by taking the similarity corresponding to each target question answering mode as a weight, so as to determine the final target answer.

Exemplarily, each activated target question answering mode includes a classification model. The classification model performs classification based on 120 vectors to obtain a classification result. The classification result represents, for example, the probability of each candidate answer of 10 candidate answers being used to answer the question. In one case, in the process of classification by using the classification model, it is also possible to perform classification by referring to the second knowledge data, so as to improve the accuracy of the classification, FIG. 5 schematically shows a flowchart of a method of training a question answering model according to an embodiment of the present disclosure.

Figure 5:
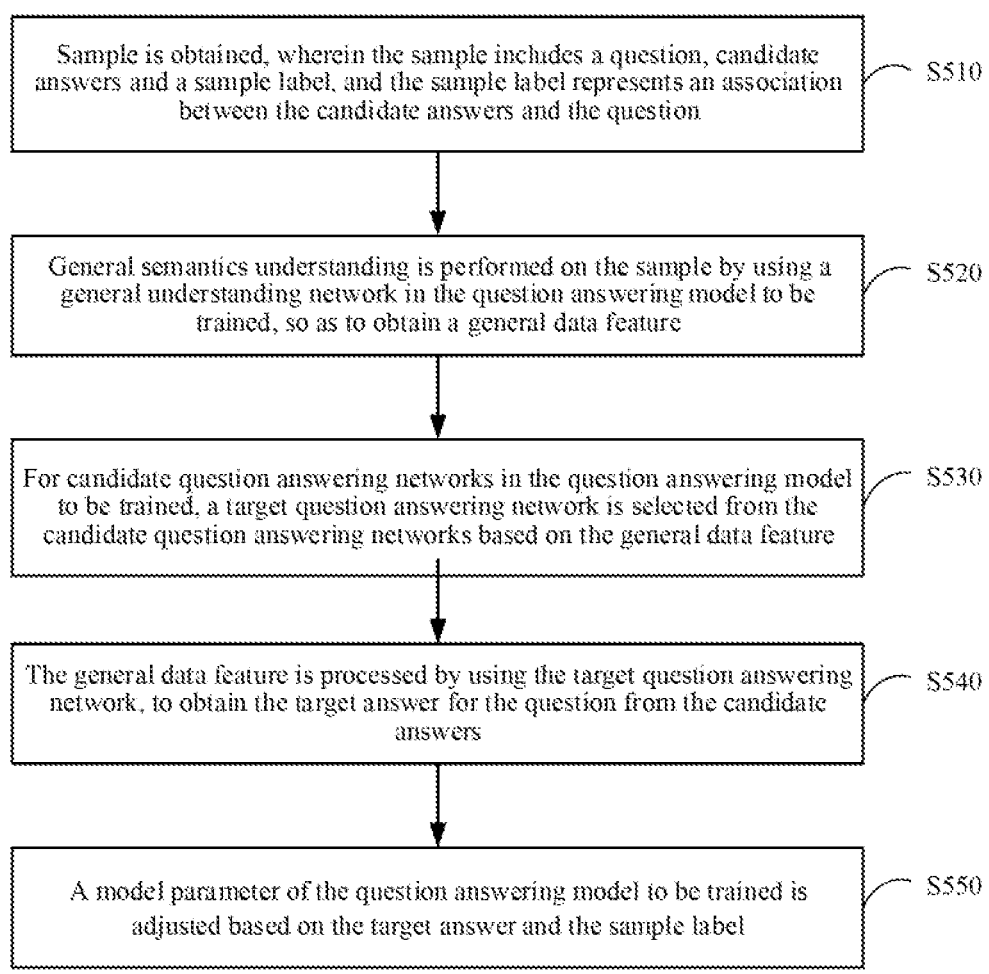
FIG. 5 schematically shows a flowchart of a method of training a question answering model according to an embodiment of the present disclosure.

As shown in FIG. 5, the method 500 of training a question answering; model in the embodiment of the present disclosure may include, for example, operation S510 to operation S560.

In operation S510, a sample is obtained, wherein the sample includes a question, candidate answers and a sample label, and the sample label represents association between the candidate answers and the question.

In operation S520, general semantics understanding is performed on the sample by using a general understanding network in the question answering model to be trained, so as to obtain a general data feature.

In operation S530, for candidate question answering networks in the question answering model to be trained, a target question answering network is selected from the candidate question answering networks based on the general data feature.

In operation S540, the general data feature is processed by using the target question answering network, to obtain the target answer for the question from the candidate answers.

In operation S550, a model parameter of the question answering model to be trained is adjusted based on the target answer and the sample label.

The general understanding network of the embodiments of the present disclosure is, for example, the same as or similar to the general understanding mode mentioned above. The candidate question answering network is, for example, the same as or similar to the candidate question answering mode mentioned above. The target question answering network is, for example, the same as or similar to the target question answering mode mentioned above.

Exemplarily, a question answering model may be trained by using a plurality of samples, Each sample has a sample label, which represents an association between the candidate answers and the question. For example, when the sample includes a question and a plurality of candidate answers A, B, and C, the sample label indicates, for example, candidate answer B is the best answer for the question.

After processing the general data feature by using the target question answering network to obtain the target answer for the question from the candidate answers, the target answer is compared with the sample label to obtain a loss value. Based on the loss value, the model parameter of the question answering model to be trained is reversely adjusted, so as to obtained a trained the question answering model. The model parameter includes a parameter of the general understanding network and parameters of the candidate question answering networks.

According to the embodiment of the disclosure, general semantic understanding is performed on the data to be processed by using the general understanding network to obtain the general data feature of the data to be processed. Then an appropriate target question answering network is selected from the plurality of candidate question answering networks based on the general data feature. The general data feature is processed by using the target question answering network to obtain the target answer, and the model parameter is adjusted based on the target answer and the sample label, thereby improving the accuracy of the question answering model, so as to improve the effect of question answering.

In an example, the candidate question answering network includes a network label. The target question answering network may be selected from the candidate question answering networks based on a similarity between the general data feature and the network label. The general data feature represents a domain information of the question, and the network label represents a domain targeted by the candidate question answering network. Among them, the network label is, for example, the same as or similar to the mode label mentioned above.

In an example, the target question answering network includes a plurality of target question answering networks. The general data feature is processed by respectively using the plurality of target question answering networks, to obtain a plurality of target answers corresponding to the plurality of target question answering networks in one-to-one correspondence. For each target question answering network, a weight is determined for the target answer of each target question answering network based, on the similarity, and then the target answer for the question is selected from the plurality of target answers based on the weight.

In an example, the candidate question answering network includes a plurality of candidate question answering networks. A number of target question answering network to be selected may be determined based on a computing resource. Then, based on the number and the general data feature, the number of target question answering networks are selected from the plurality of candidate question answering networks.

In an example, general semantic understanding is performed on the sample by using the general understanding network in the question answering model to be trained, to obtain the general data feature. For example, first knowledge data is obtained, and general semantic understanding is performed on the sample based on the first knowledge data, to obtain a question feature, a candidate answer feature and a first association information. The first association information indicates an association between the question and the candidate answers. Then, the question feature, the candidate answer feature and the first association feature are determined as the general data feature.

Exemplarily, the sample further includes a description information for the question, and the general data feature further includes a description feature for the description information.

In an example, processing the general data feature by using the target question answering mode, to obtain the target answer for the question from the candidate answers, includes: obtaining second knowledge data.

The general data feature is processed by using the target question answering network, based on the second knowledge data, to obtain a second association information between the question and the candidate answers. Then, based on the second association information, the target answer for the question is determined from the candidate answers.

The ensembling method and the sparse-coding method has been considered by the question answering model of the embodiment of the present disclosure. The ensembling method introduces a plurality of model networks to explicitly increase the parameter space of the model, and performs reasonable allocation in different parameter spaces to achieve continuous learning. For example, the embodiments of the disclosure introduce a plurality of candidate question answering networks. The sparse method sparsely activate different parameter spaces to implicitly increase the potential of existing parameter spaces, so that the impact of new knowledge on old knowledge is reduced, thereby achieving continuous learning. For example, the plurality of candidate question answering networks in the embodiments of the present disclosure may have the same model structure. Different parameters in the model may be adjusted when training different candidate question answering networks.

The embodiments of the present disclosure use a shared general understanding network for the general semantic understanding part unrelated to the domain scenario, and use a plurality of candidate question answering networks for the reasoning decision part related to the domain scenario, so as to expand and deploy the parameter space more efficiently under the premise of controlling the size of model parameters. In other words, the introduction oil the plurality of candidate question answering networks may not only effectively control size of model parameters, hut also deploy the candidate question answering networks according to the selecting mechanism in higher efficiency, so as to achieve better training effects under a premise of effectively controlling the size of model parameters.

Figure 6:
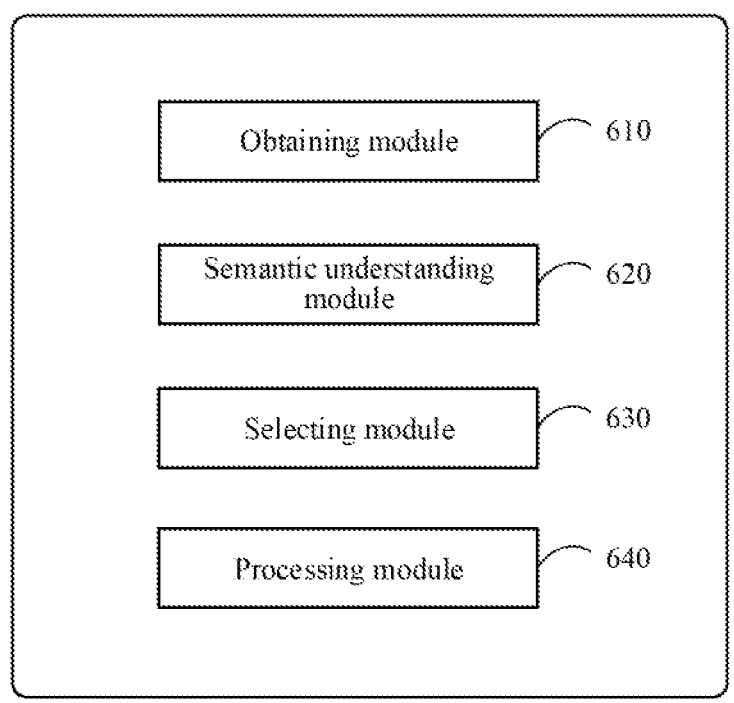
FIG. 6 schematically shows a block diagram of a question answering apparatus according to an embodiment of the present disclosure.

FIG. 6 schematically shows a block diagram of a question answering apparatus according to an embodiment of the present disclosure.

As shown in FIG. 6, the question answering apparatus 600 of the embodiment of the present disclosure includes, for example, an obtaining module 610, a semantic understanding module 620, a selecting module 630, and a processing module 640.

The obtaining module 610 may be configured to obtain data to be processed, wherein the data to be processed includes a question and candidate answers. According to the embodiment of the present disclosure, the obtaining module 610 may, for example, perform the operation S210 described above with reference to FIG. 2, which will not be repeated here.

The semantic understanding module 620 may be configured to perform general semantic understanding on the data to be processed to obtain a general data feature. According to the embodiment of the disclosure, the semantic understanding module 620 may perform the operation S220 described above with reference to FIG. 2, for example, which will not be repeated here.

The selecting module 630 may be configured to select a target question answering mode from candidate question answering modes based on the general data feature. According to the embodiment of the present disclosure, the selecting module 630 may, for example, perform the operation S230 described above with reference to FIG. 2, which will not be repeated here.

The processing module 640 may be configured to process the general data feature by using the target question answering mode to obtain a target answer for the question from the candidate answers. According to the embodiment of the present disclosure, the processing module 640 may, for example, perform the operation S240 described above with reference to FIG. 2, which will not be repeated here.

According to the embodiment of the present disclosure, the candidate question answering mode includes a mode label. The selecting module 630 is further configured to select the target question answering mode from the candidate question answering modes based on a similarity between the general data feature and the model label, wherein the general data feature represents a domain information of the question, and the model label represents a domain targeted by the candidate question answering mode.

According to the embodiment of the present disclosure, the target question answering mode includes a plurality of target question answering modes. The processing module 640 includes a first processing sub-module, a first determining sub-module and a first selecting sub-module. The first processing sub-module is configured to process the general data feature by using the plurality of target question answering modes respectively, to obtain a plurality of target answers corresponding to the plurality of target question answering modes one by one. The first determining sub-module is configured to determine, for each target question answering mode, a weight of the target answer for each target question answering mode based on the similarity. The first selecting sub-module is configured to select target answer for the question from the plurality of target answers based on the weight.

According to the embodiment of the present disclosure, the candidate question answering modes include a plurality of candidate question answering modes. The selecting module 630 includes a second determining sub-module and a second selecting sub-module. The second determining sub-module is configured to determine, based on a computing resource, a number of target question answering modes to be selected; and the second selecting sub-module is configured to select the number of target question answering modes from the plurality of candidate question answering modes based on the number and the general data feature.

According to the embodiment of the disclosure, the semantic understanding module 620 includes a first obtaining sub-module, a semantic understanding sub-module and a third determining sub-module. The first obtaining sub-module is configured to obtain first knowledge data. The semantic understanding sub-module is configured to perform general semantic understanding on the data to be processed, based on the first knowledge data, to obtain a question feature, a candidate answer feature and a first association information, wherein the first association information indicates an association between the question and the candidate answers. The third determining sub-module is configured to determine the question feature, the candidate answer feature and the first association feature as the general data feature.

According to the embodiment of the present disclosure, the processing module 640 includes a second obtaining sub-module, a second processing sub-module and a fourth determining sub-module. The second obtaining sub-module is configured to obtain second knowledge data. The second processing sub-module is configured to process the general data feature by using the target question answering mode based on the second knowledge data, to obtain a second association information between the question and the candidate answers. The fourth determining sub-module is configured to determine the target answer for the question from the candidate answers based on the second association information.

According to the embodiment of the present disclosure, the data to be processed further includes a description information for the question. The general data feature further includes a description feature for the description information.

Figure 7:
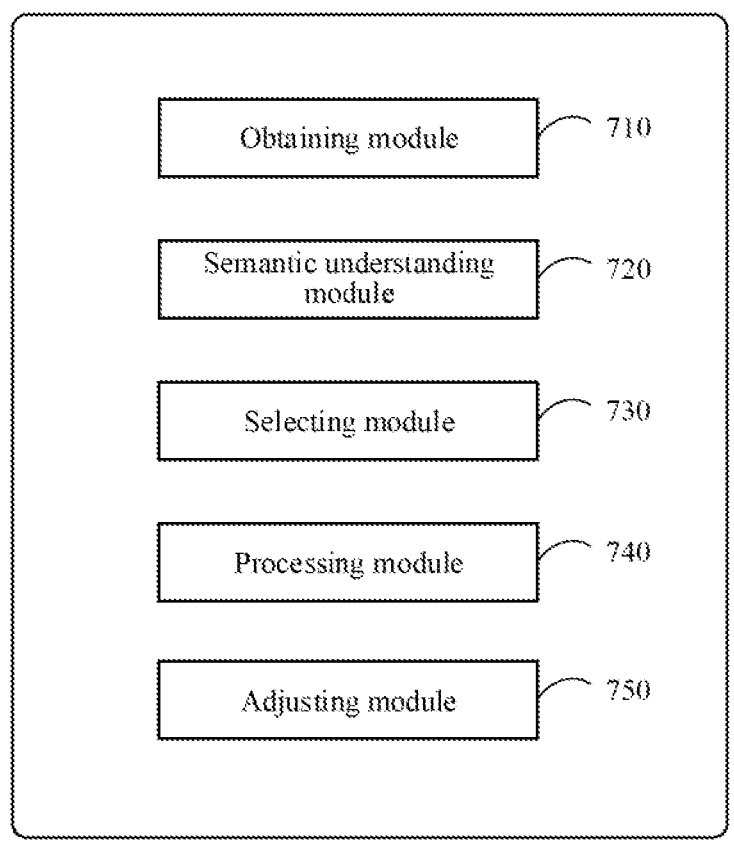
FIG. 7 schematically shows a block diagram of an apparatus of training a question answering model according to an embodiment of the present disclosure.

FIG. 7 schematically shows a block diagram of an apparatus of training a question answering model according to an embodiment of the present disclosure.

As shown in FIG. 7, the apparatus 700 of training the question answering model in the embodiment of the present disclosure includes, for example, an obtaining module 710, a semantic understanding module 720, a selecting module 730, a processing module 740, and an adjusting module 750.

The obtaining module 710 may be configured to obtain a sample, wherein the sample includes a question, candidate answers and a sample label, and the sample label represents an association between the candidate answers and the question. According to the embodiment of the present disclosure, the obtaining module 710 may, for example, perform the operation S510 described above with reference to FIG. 5, which will not be repeated here.

The semantic understanding module 720 may be configured to perform general semantic understanding on the sample by using a general understanding network in the question answering model to be trained, to obtain a general data feature. According to the embodiment of the disclosure, the semantic understanding module 720 may, for example, perform the operation S520 described above with reference to FIG. 5, which will not be repeated here.

The selecting module 730 may be configured to select, for candidate question answering networks in the question answering model to be trained, a target question answering network from the candidate question answering networks based on the general data feature. According to the embodiment of the present disclosure, the selecting module 730 may, for example, perform the operation S530 described above with reference to FIG. 5, which will not be repeated here.

The processing module 740 may be configured to process the general data feature by using the target question answering network, to obtain the target answer for the question from the candidate answers. According to the embodiment of the present disclosure, the processing module 740 may, for example, perform the operation S540 described above with reference to FIG. 5, which will not be repeated here.

The adjusting module 750 may be configured to adjust a model parameter of the question answering model to be trained based on the target answer and the sample label. According to the embodiment of the present disclosure, the adjusting module 750 may, for example, perform the operation S550 described above with reference to FIG. 5, which will not be repeated here.

According to the embodiment of the present disclosure, the candidate question answering network includes a network label. The selecting module 730 is further configured to select the target question answering network from the candidate question answering networks based on a similarity between the general data feature and the network label, wherein the general data feature represents a domain information of the question, and the network label represents a domain targeted by the candidate question answering network.

According to the embodiment of the disclosure, the target question answering network includes a plurality of target question answering networks; and the processing module 740 includes a first processing sub-module, a first determining sub-module and a first selecting sub-module. The first processing sub-module is configured to process the general data feature by respectively using the plurality of target question answering networks, to obtain a plurality of target answers corresponding to the plurality of target question answering networks one by one. The first determining sub-module is configured to determine, for each target question answering network, a weight of the target answer for each target question answering network based on the similarity. The first selecting sub-module is configured to select the target answer for the question from the plurality of target answers based on the weight.

According to the embodiment of the present disclosure, the candidate question answering networks include a plurality of candidate question answering networks. The selecting module 730 includes a second determining sub-module and a second selecting sub-module. The second determining sub-module is configured to determine, based on a computing resource, a number of target question answering network to be selected. The second selecting sub-module is configured to select the number of target question answering networks from the plurality of candidate question answering networks based on the number and the general data feature.

According to the embodiment of the disclosure, the semantic understanding module 720 includes a first obtaining sub-module, a semantic understanding sub-module and a third determining sub-module. The first obtaining sub-module is configured to obtain first knowledge data. The semantic understanding sub-module is configured to perform general semantic understanding on the sample based on the first knowledge data, to obtain a question feature, a candidate answer feature and a first association information, wherein the first association information indicates an association between the question and the candidate answers. The third determining sub-module is configured to determine the question feature, the candidate answer feature and the first association feature as the general data feature.

According to the embodiment of the present disclosure, the processing module 740 includes a second obtaining sub-module, a second processing sub-module and a fourth determining sub-module. The second obtaining sub-module is configured to obtain second knowledge data. The second processing sub-module is configured to process the general data feature by using the target question answering network, based on the second knowledge data, to obtain a second association information between the question and the candidate answers. The fourth determining sub-module is configured to determine the target answer for the question from the candidate answer based on the second association information.

According to the embodiment of the present disclosure, the sample further includes a description information for the question. The general data feature further includes a description feature for the description information.

In the technical solution of this disclosure, collecting, storing, using, processing, transmitting, providing, and disclosing etc. of the personal information of the user involved in the present disclosure all comply with the relevant laws and regulations, are protected by essential security measures, and do not violate the public order and morals.

According to the embodiments of the present disclosure, the present disclosure further provides an electronic device, a readable storage medium, and a computer program product.

Figure 8:
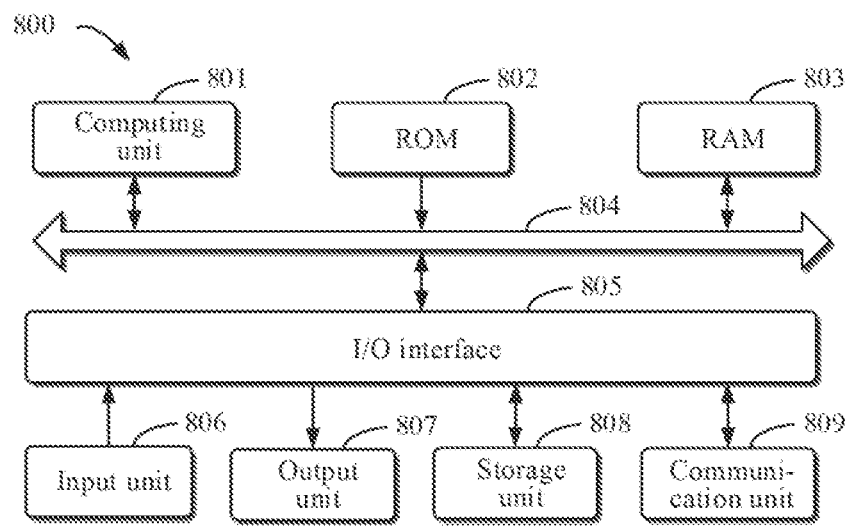
FIG. 8 is a block diagram of an electronic device used to perform question answering and/or training a question answering model in an embodiment of the present disclosure.

FIG. 8 is a block diagram of an electronic device used to perform question answering and/or training a question answering model in an embodiment of the present disclosure.

FIG. 8 shows a block diagram of an electronic device 800 of an embodiment of the present disclosure. The electronic device 800 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 may include computing unit 801, which may perform various appropriate actions and processing based on a computer program stored in a read-only memory (ROM) 802 or a computer program loaded from a storage unit 808 into a random access memory (RAM) 803. Various programs and data required for the operation of the electronic device 800 may be stored in the RAM 803. The computing unit 801, the ROM 802 and the RAM 803 are connected to each other through a bus 804. An input/output (I/O) interface 805 is further connected to the bus 804.

I/O interface 805 are connected to various components in the electronic device 800, including an input unit 806, such as a keyboard, a mouse, etc.; an output unit 807, such as various types of displays, speakers, etc.; a storage unit 808, such as a magnetic disk, an optical disk, etc.; and a communication unit 809, such as a network card, a modem, a wireless communication transceiver, etc. The communication unit 809 allows the electronic device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the question answering method and/or the method of training a question answering model. For example, in some embodiments, the question answering method and/or the method of training a question answering model may be implemented as a computer software program that is tangibly contained on a machine-readable medium, such as a storage unit 808. In some embodiments, part or all of a computer program may be loaded and/or installed on the electronic device 800 via the ROM 802 and/or the communication unit 109. When the computer program is loaded into the RAM 803 and executed by the computing unit 801, one or more steps of the question answering method and/or the method, of training a question answering model described above may be performed. Alternatively, in other embodiments, the computing unit 801 may be configured to perform the question answering method and/or the method of training a question answering model in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable question answering apparatuses and/or apparatuses of training a question answering model, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including the question answering apparatus and/or the apparatus of training a question answering model (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also referred to as a cloud computing server. The server may also be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a question answering model, wherein the question answering model comprises:
   a general understanding network, and
   a plurality of candidate question answering networks,
      the general understanding network is a natural language processing model, and the candidate question answering network is a classification model, the method comprising:
   obtaining a sample, wherein
      the sample comprises a question, candidate answers and a sample label, and
      the sample label represents an association between the candidate answers and the question;
   performing general semantic understanding on the sample by using a general understanding network in the question answering model to be trained, to obtain a general data feature;
   selecting, for candidate question answering networks in the question answering model to be trained, a target question answering network from the plurality of candidate question answering networks based on the general data feature;
   processing the general data feature by using the target question answering network, to obtain the target answer for the question from the candidate answers; and
   comparing the target answer with the sample label to obtain a loss value,
   reversely adjusting a model parameter of the question answering model to be trained based on the loss value,
   the model parameter including a parameter of the general understanding network and parameters of the plurality of candidate question answering networks;
   wherein the performing of the general semantic understanding on the sample by using the general understanding network in the question answering model to be trained, to obtain a general data feature, comprises:
      obtaining first knowledge data that comprises common sense data or professional data,
      performing general semantic understanding on the sample based on the first knowledge data, to obtain a question feature, a candidate answer feature and a first association information,
   wherein the first association information indicates an association between the question and the candidate answers, and
      determining the question feature, the candidate answer feature and the first association information as the general data feature,
      the candidate question answering network comprises a network label, and
      the selecting a target question answering network from the plurality of candidate question answering networks based on the general data feature comprises:
         selecting, based on a similarity between the general data feature and the network label, top N candidate questions answering networks ranked by similarity from the plurality of candidate question answering networks, as the target question answering network matched with a domain of the question, where N is an integer that is greater than or equal to 1, and
   wherein the general data feature represents a domain information of the question, and the network label represents a domain targeted by the candidate question answering network.

2. The method of claim 1, wherein
   the target question answering network comprises a plurality of target question answering networks; and
   the processing the general data feature by using the target question answering network, to obtain the target answer for the question from the candidate answers, comprises:
      processing the general data feature by respectively using the plurality of target question answering networks, to obtain a plurality of target answers corresponding to the plurality of target question answering networks one by one;
      determining, for each target question answering network, a weight of the target answer for each target question answering network based on the similarity; and
      selecting the target answer for the question from the plurality of target answers based on the weight.

3. The method of claim 1, wherein
   the candidate question answering networks comprise a plurality of candidate question answering networks; and
   the selecting a target question answering network from the candidate question answering networks based on the general data feature comprises:
      determining, based on a computing resource, a number of target question answering network to be selected; and
      selecting the number of target question answering networks from the plurality of candidate question answering networks based on the number and the general data feature.

4. The method of claim 1, wherein the processing the general data feature by using the target question answering network, to obtain a target answer for the question from the candidate answers, comprises:
   obtaining second knowledge data;
   processing the general data feature by using the target question answering network, based on the second knowledge data, to obtain a second association information between the question and the candidate answers; and
   determining the target answer for the question from the candidate answers based on the second association information.

5. The method of claim 1, wherein the sample further comprises a description information for the question; and the general data feature further comprises a description feature for the description information.

6. An electronic device, comprising:
   at least one processor; and
   a memory communicatively coupled with the at least one processor;
      wherein the memory stores instructions executable by the at least one processor, and the instructions, when executed by the at least one processor, cause the at least one processor to implement the method of claim 1.

7. The electronic device of claim 6, wherein the target question answering network comprises a plurality of target question answering networks; and the at least one processor is further configured to:

process the general data feature by using the plurality of target question answering networks respectively, to obtain a plurality of target answers corresponding to the plurality of target question answering networks one by one;

determine, for each target question answering network, a weight of the target answer for each target question answering network based on the similarity; and select the target answer for the question from the plurality of target answers based on the weight.

8. A non-transitory computer readable storage medium storing computer instructions, wherein the computer instructions are configured to cause a computer to implement the method of claim 1.

\* \* \* \* \*